US 007684391B2

(12) United States Patent
Liu

(10) Patent No.: US 7,684,391 B2
(45) Date of Patent: Mar. 23, 2010

(54) COMMUNICATIONS SYSTEM FOR DELIVERING MULTIMEDIA INTERNET PROTOCOL PACKETS ACROSS NETWORK BOUNDARIES

(75) Inventor: Chia J. Liu, Holmdel, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1106 days.

(21) Appl. No.: 11/331,799

(22) Filed: Jan. 13, 2006

(65) Prior Publication Data

US 2007/0165668 A1 Jul. 19, 2007

(51) Int. Cl.
*H04L 12/26* (2006.01)

(52) U.S. Cl. ...................... 370/389; 370/231
(58) Field of Classification Search ................. 370/466, 370/231, 389
See application file for complete search history.

(56) References Cited

U.S. PATENT DOCUMENTS

| 6,785,738 | B1 * | 8/2004 | Ivaturi | 709/245 |
| 2005/0190755 | A1 * | 9/2005 | Singh et al. | 370/389 |
| 2006/0002370 | A1 * | 1/2006 | Rabie et al. | 370/351 |
| 2006/0256768 | A1 * | 11/2006 | Chan | 370/351 |

* cited by examiner

*Primary Examiner*—Derrick W Ferris
*Assistant Examiner*—Christopher R Crompton
(74) *Attorney, Agent, or Firm*—Banner & Witcoff, Ltd.

(57) ABSTRACT

A communications system and method enables delivery of packets over network boundaries while preserving the QoS bits configuration. The communications system includes at least one sending site configured to send the packet. The packet may have a first set of bits in a first bit-set location that indicates an intended packet forwarding priority of the packet. A data network is included that has a traffic class identification. The data network associates the packet forwarding priority with the traffic class identification and writes a second set of bits into the first bit-set location of the packet based on the traffic class identification. The second set of bits indicates a delivery priority that corresponds to the packet forwarding priority. The packet is forwarded based on at least one of the packet forwarding priority and the delivery priority, wherein the delivery priority is based on the data traffic class identification.

22 Claims, 3 Drawing Sheets

COMMUNICATIONS SYSTEM FOR DELIVERING MULTIMEDIA INTERNET PROTOCOL PACKETS ACROSS NETWORK BOUNDARIES

TECHNICAL FIELD

The present invention relates to a system and method for forwarding multimedia packets with quality of service (QoS) requirements across multiple network boundaries.

BACKGROUND

Multiple service operator (MSO) networks and/or customer networks conventionally forward data in packets. These packets include, among other things, information related to the manner in which the packet is to be forwarded. For example, in a conventional IPv4 packet, eight bits (i.e., one byte) are allocated to a differentiated services field (i.e. the type of service (TOS) byte), which specifies any preferences for how the packet should be handled as it is forwarded through a network. Particularly, the differentiated services byte may indicate whether the packet should be forwarded with or without special packet handling features, including, but not limited to packet recovery if the packet is lost or corrupted during transmission. The manner in which packets are delivered is commonly divided into traffic class identifications, which typically include "best-effort" delivery and quality of service (QoS) delivery. When a packet is forwarded without special handling features, such a delivery priority is conventionally referred to as best-effort delivery. Additionally, no receipt confirmation or delivery guarantees are provided by the network when best-effort delivery is implemented. Alternatively, a delivery priority wherein the packets are forwarded with special handling features is conventionally referred to as QoS delivery. In either case, the differentiated services byte indicates how the packet is to be handled during delivery.

Although the conventional networks have adopted an approach to packet delivery that enables differential treatment for different service levels within a single network, there exists a wide horizon for improvement in treatment of inter-networking packets. Specifically, it is common for packets to be forwarded between a MSO and its transit internet service provider (ISP), between a Tier 1 and a Tier 2 ISPs, between a MSO and its business customer networks, and/or between peering MSO networks. However, most networks have unique traffic class identifications and bit mappings that differ from other peering networks. For example, one MSO may have a bit configuration whose corresponding traffic class identification indicates best-effort delivery, while the same bit configuration at a peering network has a corresponding traffic class identification that indicates a particular delivery priority. Accordingly, a bit configuration for a packet in one network may receive high priority delivery while the same bit configuration receives best effort delivery in a peering network. Thus, there is a need for a system and method of delivering packets across network boundaries in a manner that enables accurate packet delivery treatment.

The present invention was conceived in view of these and other disadvantages of conventional communications systems.

SUMMARY

The present invention provides a system and method for delivering packets over network boundaries while preserving any intended QoS information of the packet. Accordingly, a communications system for transferring packets is disclosed that includes a first site configured to generate the packets. In one embodiment, the packets have at least one set of bits in a first bit-set location that indicates a packet forwarding priority of the packet. The communications system also includes a service provider or data network having a service provider traffic class identification. The data network receives the packet and determines the packet forwarding priority. Additionally, the data network associates the packet forwarding priority with the traffic class identification and writes a second set of bits into the first bit-set location of the packet. The second set of bits written by the data network indicates a delivery priority that corresponds to the packet forwarding priority. Additionally, the data network forwards the packet in accordance with the delivery priority and the traffic class identification.

The method of delivering a packet includes transmitting the packet from a first site wherein the packet has at least one set of bits in a first bit-set location that indicates an intended packet forwarding priority of the packet. The method also includes receiving the packet at a service provider or data network having a traffic class identification. The method further includes associating the packet forwarding priority with the traffic class identification and writing a second set of bits into the first bit-set location of the packet based on the traffic class identification. In one embodiment, the second set of bits indicates a delivery priority that corresponds to the packet forwarding priority.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components and/or devices. Therefore, specific functional details disclosed herein are not to be interpreted as limiting, but merely as a representative basis for the claims and/or as a representative basis for teaching one skilled in the art to variously employ the present invention.

Figure 1:
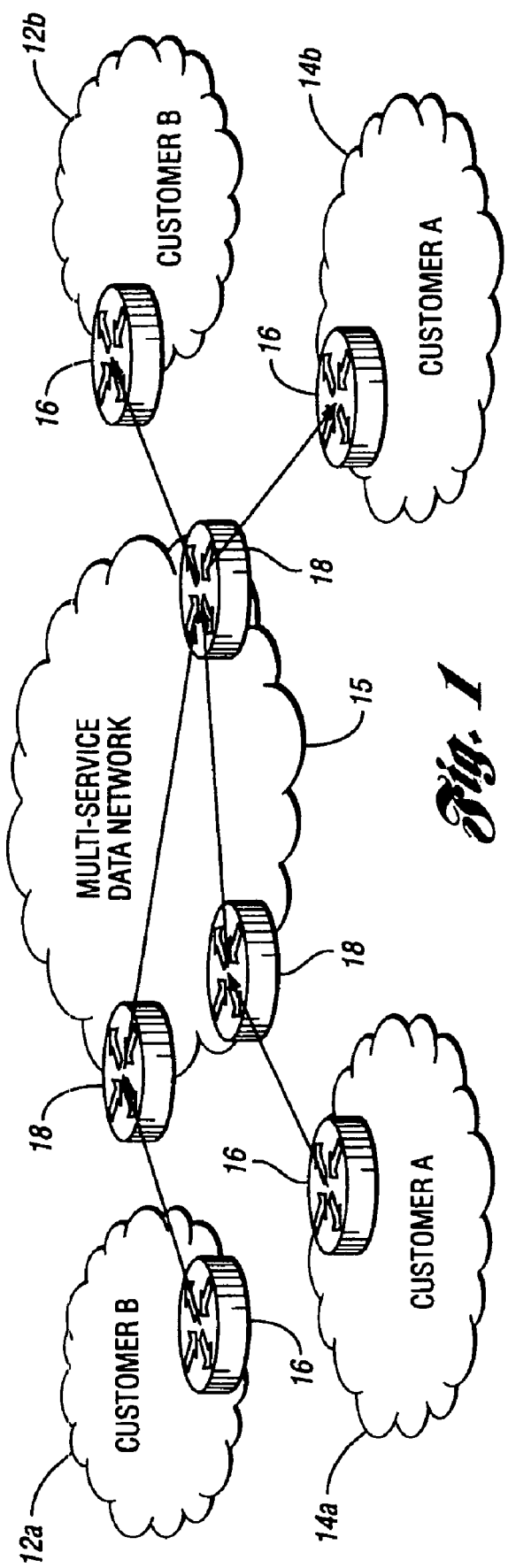
FIG. 1 illustrates a communications system in accordance with an embodiment of the present invention.

Referring to FIG. 1, a communications system 10 is shown. Communications system 10 enables the delivery (also referred to as forwarding) of voice, video, e-mails, data, and the like as data packets (also referred to as "packets") from one network to another. Communication systems 10 may be an internet protocol (IP) over a dense wavelength division multiplexing (DWDM) packet-switched network, an IP over asynchronous transfer mode (ATM) network and the like.

As shown, communications system 10 may have a plurality of attached customer networks (e.g., Customer A and Customer B) or peer networks. The networks may have multiple sites/networks (12a, 12b, 14a, and 14b), for generating and receiving packets. For example, at site 14a, Customer A may generate a packet that is received by Customer A at a second site 14b. Accordingly, each customer site includes at least one router 16 that enables the delivery and receipt of packets from one site to another (e.g., from originating site 12a to receiving site 12b). Additionally, although the embodiments described herein describe the forwarding of a packet between sites of a single customer (i.e., sites 14a to 14b), the present invention is equally applicable to instances where a packet is forwarded between sites of different customers. For example, packets may be sent from Customer A at site 14a to Customer B at site 12b in accordance with the present invention without departing from the scope of the present invention.

The communications system 10 may also comprise a multi-service data network, which may also be referred to as a service provider or data network 15. The service provider or data network 15 functions as a transit network that enables the transfer of packets from, for example, site 12a to site 12b, and/or site 14a to site 14b. As described above, data network 15 may enable the transfer of packets from, for example, site 12a to site 14b. Accordingly, the service provider network 15 may be adapted to forward virtually any type of packet. When a packet is generated and forwarded by the router 16, the packet may be received by at least one router 18 that is part of the service provider or data network 15. The received packet may then be forwarded to other routers within the service provider network 15 and/or directly to the router 16 at a receiving site (e.g., sites 12b and/or 14b). In one aspect, the router 18, which initially receives the incoming packet and is located at an ingress point within the service provider or data network 15, is referred to as an ingress router. Accordingly, routers that forward the packet to the respective receiving site that are located at an egress point are referred to as egress routers. It is recognized, however, that in alternative embodiments the service provider network 15 may utilize a single router for both ingress and egress operations. Additionally, although the embodiments herein illustrate primarily an ingress and egress router 18, it is recognized that the service provider network 15 may include other ingress and egress routers that communicate with various core routers (not shown) without departing from the scope of the present invention. Also, the service provider network 15 has a traffic class identification for mapping the bit marking of a received packet with the traffic class identification for proper packet delivery priority.

As recognized by one of ordinary skill in the art, Customers A and B may be configured to transfer packets having a particular packet forwarding priority (e.g., best-effort delivery or quality of service (QoS) delivery). In one aspect, the term "packet forwarding priority," as stated herein, is the delivery treatment the packet receives while forwarded within either Customer A or Customer Bs' network (without including service provider network 15). The term "packet forwarding priority" also refers to the packet treatment of the packet when the packet is initially forwarded from Customer A or Customer Bs' network to, for example, service provider network 15.

Now, a description of a typical service agreement relationship between customers (e.g., Customers A and B) and a service provider (e.g., service provider network 15) will be provided. Conventionally, Customers A and B enter into a service agreement that indicates how generated packets are to be treated as the packets are handled by service provider network 15. For example, Customer A may have an agreement with service provider network 15, which provides that service provider network 15 is to provide a particular QoS delivery for a particular class of packets received from Customer A. Additionally, Customer B may have an agreement with service provider network 15 which provides that Customer B receive best-effort only delivery service. In both cases, the service provider should ensure QoS transparency. Specifically, the QoS marking information of both types of customer traffic should not be lost while being forwarded through the service provider's network. In one aspect, the embodiments described herein provide a system and method that enables efficient and cost-effective service to customers in accordance with any applicable, although not necessary, service agreements.

Figure 2:
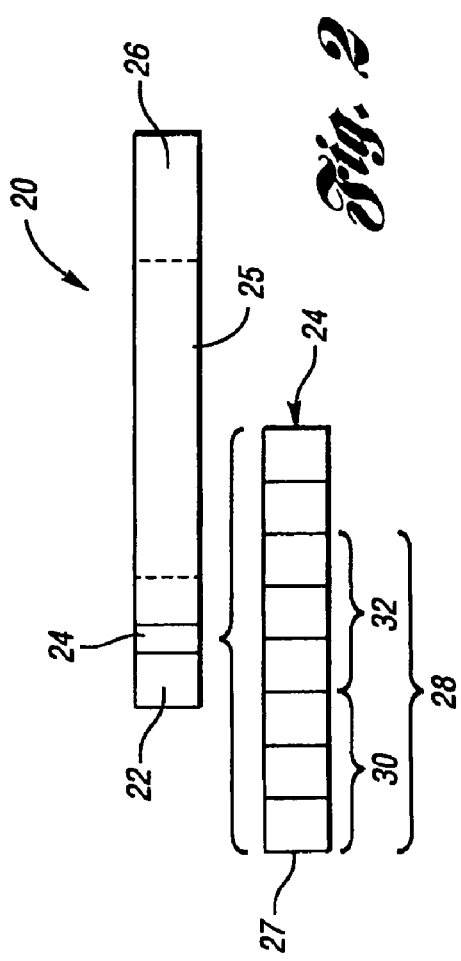
FIG. 2 illustrates a detailed illustration of a packet that may be forwarded by the communications system of FIG. 1 in accordance with an embodiment of the present invention.

Accordingly, referring to FIG. 2, a detailed illustration of an exemplary packet (i.e., packet 20) is shown that is deliverable by communications system 10. As discussed above, the packet 20 may be generated by a customer and forwarded from one customer site to another customer site through the use of the service provider network 15. In one embodiment, the packet 20 may be a packet that is compatible with version 4 of the Internet Protocol (i.e., IPv4 packet). It is also recognized that the packet 20 may be compatible with other versions of the Internet Protocol including, but not limited to IPv6 and the like. As such, as recognized by one of ordinary skill in the art, the packet 20 includes a header section 22, a data section 25, and a trailer section 26. The header section 22 includes a plurality of bytes, one of which (i.e., byte 24) may be used to indicate the packet forwarding priority and the delivery priority (e.g., best-effort delivery or QoS delivery) for the packet 20.

In one aspect of the present invention, the term "delivery priority," as stated herein, includes the manner in which the packet 20 may be handled by the service provider network 15. In some instances, however, the packet forwarding priority and the delivery priority (described above) differ. For example, Customer A may have a service agreement with the service provider or data network 15 that requires the service provider or data network 15 to provide best-effort delivery (as opposed to QoS delivery) to Customer A's packets. However, within Customer A's network, all of its packets receive QoS delivery. Therefore, the "packet forwarding priority" for Customer A's packets within Customer A's network indicates QoS delivery. Conversely, the "delivery priority" as determined by the service provider network 15 in accordance with the service agreement, indicates best-effort delivery. In one aspect of the present invention, the communications system 10 is capable of determining the correct type of packet delivery, even in instances where the packet forwarding priority differs from the delivery priority. It is recognized that some conventional systems are incapable of correctly determining the correct packet delivery priority when a customer's unique packet forwarding priority differs from the delivery priority. In such a case, conventional systems are incapable of providing proper packet treatment without changing the packet's QoS marking.

In either case of a customer's packet forwarding priority or the delivery priority of the service provider network 15, the priority byte 24 includes 8 bits (labeled 27). Additionally, as recognized by one of ordinary skill in the art, the first 6 bits of the priority byte 24 are commonly referred to as the differentiated services code point field (DSCP) as indicated by bracket 28. In one embodiment of the present invention, the DSCP field 28 is partitioned into two separate bit locations or positions for preserving the packet forwarding priority and mapping the packet forwarding priority to the delivery priority in accordance with the service provider traffic class identification. As illustrated in FIG. 2, the first three bit positions may be referred to as a first bit-set location 30, and the next three bit positions may be referred to as a second bit-set location 32. In one aspect, the value of the bits within the first bit-set location 30 are used to define a current traffic behavior for the packet 20 (either while traveling on the customer site 14 or the data network 15) while the second bit-set location 32 may be used to preserve the customer or peer traffic QoS information. It is recognized, however, that although the embodiments described herein utilize bits in groups of three, alternative embodiments may utilize more or less bits without departing from the scope of the present invention.

Figure 3:
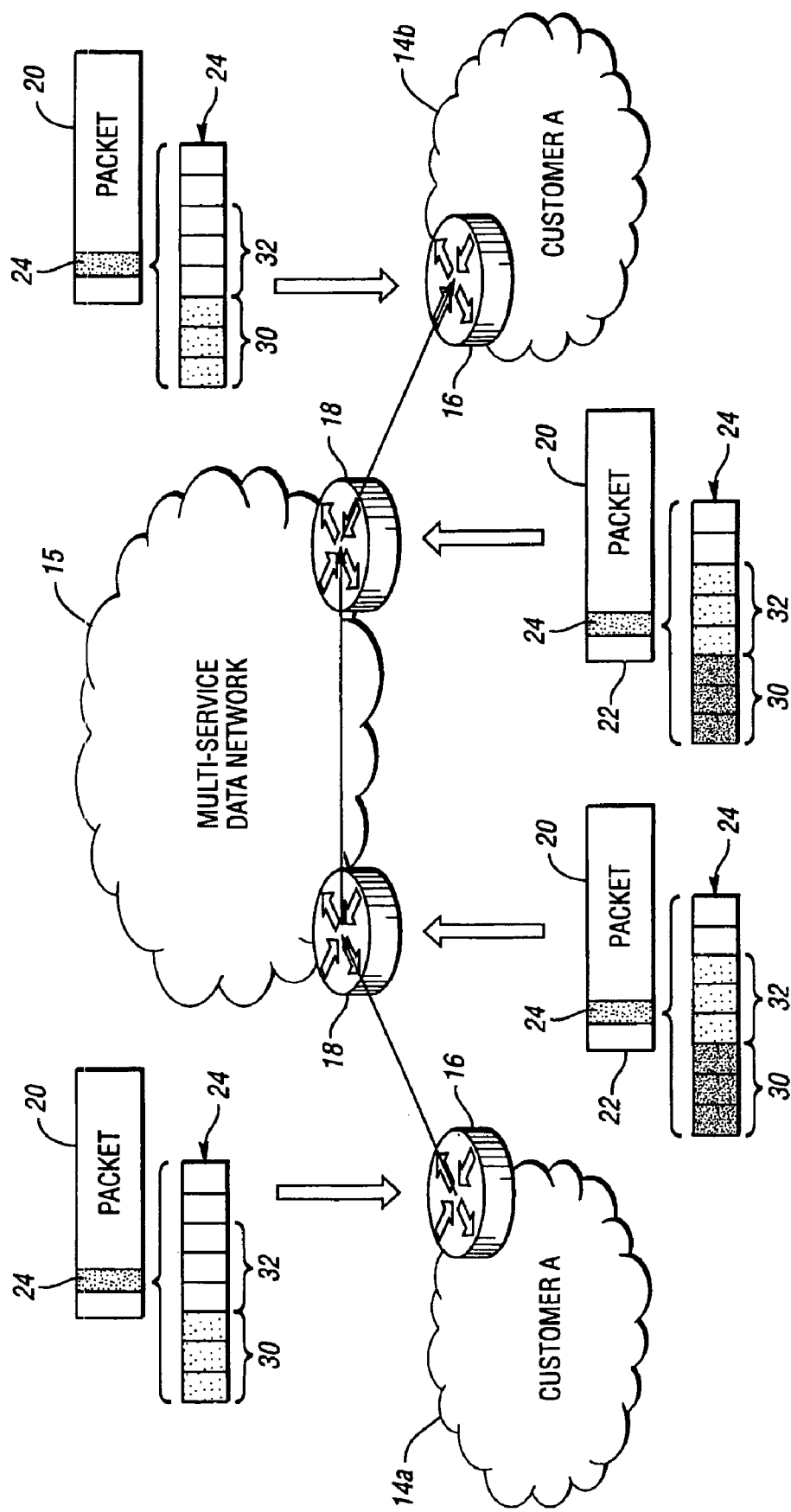
FIG. 3 illustrates the forwarding of a packet at various packet forwarding stages by a communications system in accordance with an embodiment of the present invention.

Referring to FIG. 3, the communication system 10 is illustrated showing the delivery of the packet 20 from the site 14a to the site 14b at various stages. As described above, the site 14a is configured to send and/or receive the packet 20. The packet 20 includes the priority byte 24 that is used for determining the per hop behavior of the packet 20 and to preserve the packet forwarding priority (e.g., best-effort, QoS, and the like). In the embodiment shown, the bits in the first bit-set location 30 indicate the packet forwarding priority of the packet 20 as it leaves the site 14a. Particularly, the bits within the first bit-set location 30 indicate whether the packet 20 should receive, for example, best-effort delivery or QoS delivery. Upon receipt of the packet 20 by the service provider network 15, the ingress router 18 writes the bits located in the first bit-set location 30 into the second bit-set location 32, as shown in FIG. 3, thereby preserving the original bit markings from the first bit-set location 30. It is recognized that the bits written into the second bit-set location 32 may be copied or moved from the first bit-set location without departing from the scope of the present invention. Additionally, the service provider or data network 15 maps the packet forwarding priority of the packet 20 with the service provider traffic class identification, thereby determining the delivery priority. Based upon this mapping, the router 18 writes the corresponding bits into the first bit-set location 30 as indicated by the corresponding shading of the first and second bit-set locations 30 and 32. The bits written into the first bit-set location 30 by the service provider network 15 are compatible with the service provider traffic class identification. Thus, the service provider network 15 is capable of associating (i.e., mapping) the packet forwarding priority (as originally established by the Customer A) with the traffic class identification of the service provider network 15 to determine the delivery priority. In one embodiment, the bits written into the first bit-set location 30, by the router 18, are unique to the service provider network 15. Nevertheless, the packet 20 is forwarded through the service provider network 15 in accordance with the delivery priority.

Once the packet 20 arrives at an egress router (e.g., router 18), the bits written into the second bit-set location 32 are re-written into the first bit-set location 30. Accordingly, once the packet 20 is received at the site 14b, the first bit-set location 30 has the same bit marking as when the packet 20 was sent from the site 14a, as indicated by the shading of bit-set location 30 at sites 14a and 14b. It is recognized that the bits written back into the first bit-set location 30 by the egress router may be copied or moved from the second bit-set location 32 without departing from the scope of the present invention.

Figure 4:
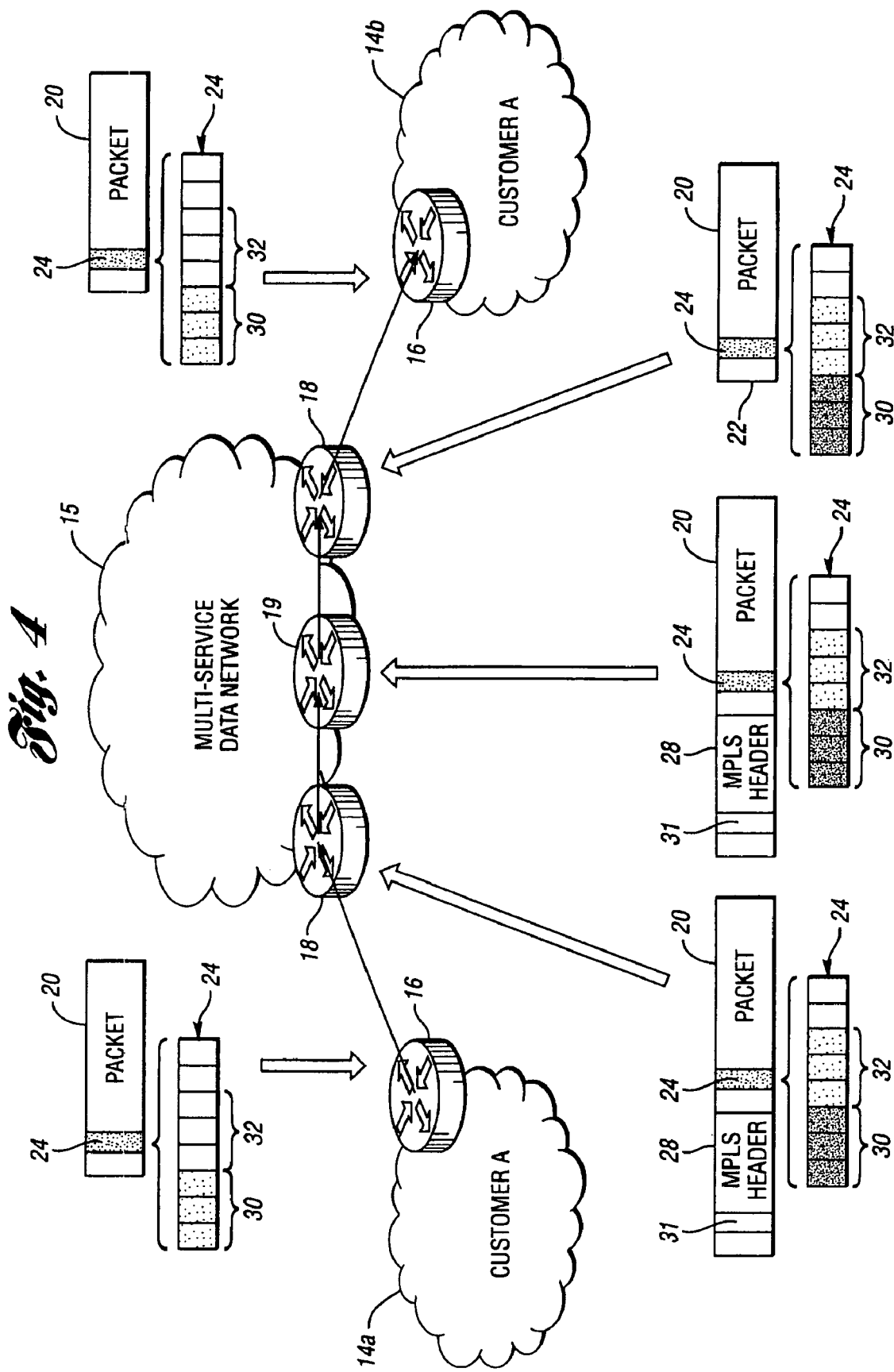
FIG. 4 illustrates a communications system at various packet forwarding stages in accordance with an alternative embodiment of the present invention.

Now referring to FIG. 4, an embodiment of communications system 10 is shown that illustrates the delivery of an alternative embodiment of the packet 20. Particularly, the mapping and preservation of packet forwarding priority by communications system 10 is accomplished through the use of a multi-protocol label switching (MPLS) header in addition to the byte 24. As recognized by one of ordinary skill, the MPLS provides a means to map internet protocol addresses to fixed-length labels that are used by various packet-forwarding technologies. Accordingly, the MPLS header 28 includes three bits whose configuration indicates the delivery priority for the packet 20. In one embodiment, the MPLS header 28 includes experimental (EXP) bits whose bit value may indicate the delivery priority for packet 20. Additionally, as shown, the first bit-set location 30 and the second bit-set location 32 are also used to map and preserve the packet forwarding priority of the packet 20.

It is recognized that in some instances, the MPLS header 28 associated with packet 20 should be removed prior to re-entering or being received by the network of Customer A (e.g., site 14b). In such a case, a router within the service provider or data network 15 typically removes the MPLS header 28 and performs a routing lookup to forward the packet 20 to the appropriate outbound interface (e.g., router 18). However, it is known that executing both the MPLS header removal and route lookup functions are burdensome on the central processing unit of the router. Accordingly, in one embodiment, a router 19, which may also be referred to as a penultimate hop router, performs the function of removing the MPLS header 28 and forwarding the packet 20 to the egress router 18. As such, the QoS treatment may be based upon the delivery priority indicated at the ingress router 18. Thus, the QoS treatment at the last hop of service provider or data network 15 (i.e., egress router 18) may be based upon the delivery priority, which may be initially set by the ingress router 18 for use by the egress router 18.

As illustrated in FIG. 4, once the packet 20 is sent by the site 14a and received by the service provider or data network 15 at router 18, the MPLS header 28 is appended to packet 20 by router 18. In the illustrated embodiment, bits 31 of the MPLS header 28 indicate the delivery priority for packet 20. Based on the delivery priority, which is determined in accordance with the traffic class identification, the packet 20 is forwarded throughout the service provider network 15 with either best-effort treatment or QoS treatment. Additionally, as described above, the first bit-set location 30 is re-written by the router 18 in accordance with the traffic class identification of the service provider or data network 15. The ingress router 18 also writes the bits that were originally in the bit-set location 30 at the site 14a into the second bit-set location 32, as indicated by the shading of bit-set locations 30 and 32. At the router 19 and as described above, the MPLS header 28 is removed from the packet 20 prior to forwarding of the packet 20 to egress router 18.

At the egress router 18, the bits located in the second bit-set location 32 are written into the bit-set location 30 prior to being forwarded to the router 16. As such, the egress router 18 may not be required to perform both the MPLS removal and route lookup functions. Thus, router 18 can treat the packet 20 properly based on the delivery priority. Accordingly, the original bit marking for the packet 20 is preserved and the handling of the packet 20 by the service provider or data network 15 is transparent to Customer A.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A communications system for transferring a packet, the system comprising:
   a first site configured to send the packet, wherein the packet has a first set of bits in a first bit-set location that indicate a packet forwarding priority of the packet; and
   a data network having a traffic class identification, that receives the packet, determines the packet forwarding priority, associates the packet forwarding priority with the traffic class identification and writes a second set of bits into the first bit-set location based on the traffic class identification,
   wherein the second set of bits indicate a delivery priority that corresponds to the packet forwarding priority, the data network forwarding the packet based on the delivery priority, and
   wherein the first set of bits is written into a second bit-set location of the packet.

2. The system according to claim 1, wherein the first set of bits is written into the first bit-set location at an egress point within the data network.

3. The system according to claim 2, wherein the data network re-writes the one set of bits into the first bit-set location at an egress point through the use of a router.

4. The system according to claim 1, wherein the service provider network associates the packet forwarding priority with the service provider traffic class identification through the use of an ingress router.

5. The system according to claim 1, wherein the packet forwarding priority includes best-effort delivery or quality of service (QoS) delivery.

6. The system according to claim 1, wherein the packet includes a differentiated services code point (DSCP) field having six bits, wherein the first bit-set location is stored in the first three bits of the DSCP field and the second bit-set location is stored in the last three bits of the DSCP field.

7. A method comprising:
   receiving a packet from a first network at a router of a second network, wherein said packet comprises a header having a type of service field defining a quality of service, wherein said type of service field comprises at least two bit-set locations, and wherein a first of the at least two bit-set locations stores a first delivery treatment for forwarding the packet within the first network;
   mapping the first delivery treatment to a second delivery treatment for forwarding the packet within the second network;
   writing the first delivery treatment to a second of the at least two bit set locations;
   writing the second delivery treatment to the first of the at least two bit set locations; and
   forwarding the packet within the second network based on the second delivery treatment.

8. The method of claim 7, wherein the receiving, mapping, writing, and forwarding steps are performed by an ingress router of the second network.

9. The method of claim 7, wherein the first delivery treatment represents a packet forwarding priority of the first network, and the second delivery treatment represents a traffic class identification of the second network.

10. The method of claim 7, wherein the first network comprises a first portion and a second portion, and wherein said second network is logically in-between said first portion and said second portion so that data traffic must be transmitted through the second network to get from one portion of the first network to the other,
    wherein receiving the packet from the first network comprises receiving the packet from the first portion of the first network, and wherein the method further comprises:
    prior to forwarding the packet to the second portion of the first network, writing the first delivery treatment to the first bit set location.

11. The method of claim 10, wherein said writing the first delivery treatment to the first bit set location is performed by an egress router of the second network.

12. The method of claim 7, further comprising appending a multi-protocol label switching (MPLS) header to the packet, said MPLS heading including a third bit set location indicating the second delivery treatment of the packet.

13. The method of claim 12, further comprising removing the MPLS header at a penultimate hop router within the second network before the packet is routed outside the second network.

14. The method of claim 12, wherein the third bit set location further stores an experimental (EXP) bit.

15. A system comprising one or more communicatively coupled routers, said one or more routers configured to perform a method for routing a data packet, said method comprising:
    receiving the data packet from a first network at a first router of the system, wherein said first network is logically distinct from the system, wherein said data packet comprises a header having a type of service field defining a quality of service, wherein said type of service field comprises at least two bit-set locations, and wherein a first of the at least two bit-set locations stores a first delivery treatment for forwarding the data packet within the system;
    mapping the first delivery treatment to a second delivery treatment for forwarding the data packet within the system;
    writing the first delivery treatment to a second of the at least two bit set locations;
    writing the second delivery treatment to the first of the at least two bit set locations; and
    forwarding the packet within the system based on the second delivery treatment.

16. The system of claim 15, wherein the receiving, mapping, writing, and forwarding are performed by an ingress router of the second network.

17. The system of claim 15, wherein the first delivery treatment represents a packet forwarding priority of the first network, and the second delivery treatment represents a traffic class identification of the system.

18. The system of claim 15, wherein the first network comprises a first portion and a second portion, and wherein said system is logically in-between said first portion and said second portion so that data traffic must be transmitted through the system to get from one portion of the first network to the other, wherein receiving the packet from the first network comprises receiving the packet from the first portion of the first network, and wherein the method further comprises:

prior to forwarding the packet to the second portion of the first network, writing the first delivery treatment to the first bit set location.

19. The system of claim 18, wherein said writing the first delivery treatment to the first bit set location is performed by an egress router of the second network.

20. The system of claim 15, wherein said method further comprises appending a multi-protocol label switching (MPLS) header to the packet, said MPLS heading including a third bit set location indicating the second delivery treatment of the packet.

21. The system of claim 20, wherein said method further comprises removing the MPLS header at a penultimate hop router within the system before the packet is routed outside the system.

22. The system of claim 20, wherein the third bit set location further stores an experimental (EXP) bit.

\* \* \* \* \*